United States Patent
Chen et al.

(10) Patent No.: US 10,564,264 B2
(45) Date of Patent: Feb. 18, 2020

(54) DETECTION LIGHT RANGING APPARATUS AND METHOD

(71) Applicants: BOE TECHNOLOGY GROUP CO., LTD., Beijing (CN); BEIJING BOE DISPLAY TECHNOLOGY CO., LTD., Beijing (CN)

(72) Inventors: Yuandan Chen, Beijing (CN); Yajun Han, Beijing (CN); Chuang Sha, Beijing (CN); Kefang Wu, Beijing (CN); Lingling Feng, Beijing (CN); Min Zhang, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 281 days.

(21) Appl. No.: 15/653,574

(22) Filed: Jul. 19, 2017

(65) Prior Publication Data

US 2018/0024231 A1   Jan. 25, 2018

(30) Foreign Application Priority Data

Jul. 21, 2016   (CN) .......................... 2016 1 0579136

(51) Int. Cl.
*G01C 3/08* (2006.01)
*G01S 7/481* (2006.01)
(Continued)

(52) U.S. Cl.
CPC ........... *G01S 7/4816* (2013.01); *G01S 7/4811* (2013.01); *G01S 7/4865* (2013.01); *G01S 17/10* (2013.01)

(58) Field of Classification Search
None
See application file for complete search history.

(56) References Cited

U.S. PATENT DOCUMENTS 5,880,834 A * 3/1999 Chrisp ...................... G01J 3/02
356/305
6,441,887 B1 * 8/2002 Kao ...................... G01C 15/002
356/4.01
(Continued)

FOREIGN PATENT DOCUMENTS

CN        203190964 U      9/2013
CN        203274751 U     11/2013
(Continued)

OTHER PUBLICATIONS https://web.archive.org/web/20150416173600/https://en.wikipedia.org/wiki/Optical_fiber (Year: 2015).*
(Continued)

*Primary Examiner* — Isam A Alsomiri
*Assistant Examiner* — Amir J Askarian
(74) *Attorney, Agent, or Firm* — Nath, Goldberg & Meyer; Joshua B. Goldberg

(57) ABSTRACT

The disclosure relates to a detection light ranging apparatus and method. The detection light ranging apparatus of the disclosure comprises: a detection light emitting circuit that emits detection light; a first optical assembly that divides the detection light into a first sub-detection light and a second sub-detection light; a second optical assembly that receives the second sub-detection light and causes the second sub-detection light to be emitted after being reflected at least once after being reflected by the measured object; and a timing circuit that receives the first sub-detection light and starts timing to obtain a first time, and receives the second sub-detection light emitted after being reflected at least once and finishes timing to obtain a second time. The detection light ranging apparatus of the disclosure can solve the technical problem of poor measuring precision of the prior ranging apparatuses.

16 Claims, 4 Drawing Sheets

(51) Int. Cl.
  *G01S 7/4865* (2020.01)
  *G01S 17/10* (2020.01)

(56) References Cited

U.S. PATENT DOCUMENTS

| | | | | |
|---|---|---|---|---|
| 7,583,364 B1* | 9/2009 | Mayor | ................. | G01N 21/538 356/4.01 |
| RE41,636 E * | 9/2010 | Fang | ................... | G02B 17/023 359/850 |
| 8,896,818 B2* | 11/2014 | Walsh | ................. | G01S 7/4818 356/4.01 |
| 2001/0038338 A1* | 11/2001 | Kadwell | ............. | G08B 17/107 340/630 |
| 2002/0010554 A1* | 1/2002 | Stedman | ........... | G01N 21/3504 702/28 |
| 2004/0208422 A1* | 10/2004 | Hagood | ................. | G02B 6/022 385/16 |
| 2005/0094934 A1* | 5/2005 | He | ....................... | G02B 5/3025 385/24 |
| 2006/0278830 A1* | 12/2006 | Nishizawa | ............... | G01J 3/08 250/341.1 |
| 2008/0218738 A1* | 9/2008 | Trainer | ................. | G01B 11/08 356/72 |
| 2009/0317085 A1* | 12/2009 | Izumi | ................ | G02B 6/29358 398/81 |
| 2011/0069367 A1* | 3/2011 | Sakai | ....................... | B41J 2/465 359/204.1 |
| 2011/0102764 A1* | 5/2011 | Walsh | ................. | G01S 7/4818 356/4.07 |
| 2011/0271411 A1* | 11/2011 | Rassier | ................. | G01Q 20/02 850/6 |
| 2013/0181896 A1* | 7/2013 | Gruhlke | ................. | G06F 3/017 345/156 |
| 2013/0229668 A1* | 9/2013 | Werber | ................ | G02B 26/005 356/614 |
| 2014/0226158 A1* | 8/2014 | Trainer | .................... | G02B 6/32 356/336 |
| 2015/0370077 A1 | 12/2015 | Zuo et al. | | |
| 2015/0378021 A1* | 12/2015 | Nagano | ................... | G01S 7/486 356/5.01 |
| 2016/0025564 A1* | 1/2016 | Zhang | ...................... | G01J 3/12 356/326 |
| 2016/0076872 A1* | 3/2016 | Cheng | ................. | G01B 9/02057 356/479 |
| 2016/0369332 A1* | 12/2016 | Rothberg | .............. | H01S 3/1118 |
| 2017/0052091 A1* | 2/2017 | Mori | .................... | G01M 11/088 |
| 2017/0299412 A1* | 10/2017 | Tseng | .................... | G06F 3/0362 |
| 2017/0322133 A1* | 11/2017 | Trainer | ................. | G01J 3/0218 |
| 2017/0343337 A1* | 11/2017 | Muller | ................... | G01B 11/24 |
| 2017/0372114 A1* | 12/2017 | Cho | ....................... | G01J 1/0219 |
| 2018/0064881 A1* | 3/2018 | Whalley | ........... | A61M 5/31535 |

FOREIGN PATENT DOCUMENTS

| | | |
|---|---|---|
| CN | 104297742 A | 1/2015 |
| CN | 104375148 A | 2/2015 |
| JP | 2006322911 A | 11/2006 |

OTHER PUBLICATIONS

First Office Action dated Mar. 15, 2018 in corresponding Chinese Patent Application No. 201610579136.1.

* cited by examiner

DETECTION LIGHT RANGING APPARATUS AND METHOD

CROSS-REFERENCE TO RELATED APPLICATION

This application claims the priority of Chinese Patent Application No. 201610579136.1 submitted to the Chinese Intellectual Property Office on Jul. 21, 2016, the disclosure of which is incorporated herein in its entirety by reference.

TECHNICAL FIELD

This disclosure relates to the technical field of laser ranging, and particularly relates to a detection light ranging apparatus and method.

BACKGROUND OF THE INVENTION

Laser ranging refers to measuring a distance with laser as a light source. According to working manners of the laser, laser ranging can be divided into continuous laser ranging and pulsed laser ranging, wherein the principle of the pulsed laser ranging is that the laser emitted by a ranging apparatus is received by the ranging apparatus again after being reflected by a measured object; meanwhile, a reciprocating time of the laser is recorded by the ranging apparatus. Therefore, a distance between the ranging apparatus and the measured object equals to half of the product of the speed of light and the reciprocating time. That is, the distance can be derived from the equation $L=ct/2$, where L is the distance between the ranging apparatus and the measured object, c is the speed of light, and t is the time for the laser to reciprocate once between the ranging apparatus and the measured object. Since the speed of light c is about $3 \times 10^8$ m/s, when measuring a shorter distance, time t is very short and hard to be measured precisely, thereby causing poor measuring precision of the ranging apparatus. Therefore, there is an urgent need for a ranging apparatus with high measuring precision in the art.

SUMMARY

The present disclosure has been accomplished in order to at least partially solve the problems in the prior art. The present disclosure provides a detection light ranging apparatus and method that can improve measuring precision.

According to one aspect of the disclosure, there is provided a detection light ranging apparatus comprising:

a detection light emitting circuit that emits detection light;

a first optical assembly that divides the detection light into a first sub-detection light and a second sub-detection light;

a second optical assembly that receives the second sub-detection light and causes the second sub-detection light to be emitted after being reflected at least once after being reflected by a measured object; and a timing circuit that receives the first sub-detection light and starts timing to obtain a first time, and receives the second sub-detection light emitted after being reflected at least once and finishes timing to obtain a second time.

The second optical assembly may comprise an inner supporter, an outer supporter and a first optical element, the inner supporter being located inside of the outer supporter, the first optical assembly, the detection light emitting circuit, the timing circuit and the first optical element being located within the inner supporter, the inner supporter being provided with a first opening and the outer supporter being provided with second and third openings.

The second opening may be configured to cause the second sub-detection light passing through the first opening to be emitted towards the measured object; and the third opening is configured to cause the second sub-detection light reflected by the measured object to pass through so that the second sub-detection light is reflected at least once between an inner wall of the outer supporter and an outer wall of the inner supporter.

The first opening may be further configured to cause the second sub-detection light reflected at least once to pass through and be emitted towards the first optical element; and the first optical element is configured to cause the second sub-detection light emitted in through the first opening to be emitted to the timing circuit.

The inner supporter and the outer supporter have the same shape, and both of which are S-shaped or arcuate or irregularly curved.

The second optical assembly may further comprise second and third optical elements that are located outside of the outer supporter;

the second optical element is configured to cause the second sub-detection light from the second opening to be emitted towards the measured object; and the third optical element is configured to receive the second sub-detection light reflected by the measured object and emit the second sub-detection light towards the third opening.

Both of the inner and outer supporters may be circular rings, and have the same axis.

The second and third openings may be disposed symmetrically with respect to a connecting line of the measured object and the axis, and the second and third optical elements may also be disposed symmetrically with respect to the connecting line of the measured object and the axis.

The second and third optical elements are rotatable, and a rotation angle of the second optical element is the same with that of the third optical element that rotates in a direction opposite to a rotation direction of the second optical element.

The first optical assembly may comprise fourth, fifth and sixth optical elements, wherein the fourth and fifth optical elements are disposed oppositely;

the fourth optical element is configured to divide the detection light into the first sub-detection light and the second sub-detection light, and causes the first sub-detection light to be reflected to the fifth optical element and the second sub-detection light to be emitted towards the sixth optical element;

the fifth optical element is configured to reflect the first sub-detection light to the timing circuit; and the sixth optical element is configured to cause the second sub-detection light to pass through the first and second openings so as to be emitted towards the second optical element.

The first and sixth optical elements may both be lenses; the fourth optical element is a half mirror; and the second, third and fifth optical elements are made of a reflective material, or the second, third and fifth optical elements are provided with a reflective material layer.

An angle between the connecting line of the first opening and the axis and the connecting line of the second opening and the axis may be half of an angle between the connecting line of the second opening and the axis and a connecting line of the third opening and the axis.

The first opening may be located at a side of the second opening away from the third opening.

The outer wall of the inner supporter and the inner wall of the outer supporter may both be provided with a reflective material layer or made of a reflective material.

According to another aspect of the disclosure, there is provided a detection light ranging method for measuring a distance using the above mentioned detection light ranging apparatus, the method comprising:

Step 101: emitting detection light to the first optical assembly from the detection light emitting circuit;

Step 102: by the first optical assembly, dividing the detection light into a first sub-detection light and a second sub-detection light, and emitting the second sub-detection light towards the second optical assembly;

Step 103: by the timing circuit, receiving the first sub-detection light and starting timing to obtain a first time;

Step 104: by the second optical assembly, receiving the second sub-detection light and causing the second sub-detection light to be emitted after being reflected at least once after being reflected by the measured object; and Step 105: by the timing circuit, receiving the second sub-detection light emitted after being reflected at least once and finishing timing to obtain a second time.

In Step 102, the fourth optical element divides the detection light into the first sub-detection light and the second sub-detection light, and causes the first sub-detection light to be reflected to the fifth optical element.

In Step 103, the fifth optical element reflects the first sub-detection light to the timing circuit so that the timing circuit starts timing to obtain the first time.

Step 104 includes:

Step 1041: the second sub-detection light passing through the first and second openings successively to be emitted towards the second optical element;

Step 1042: by the second optical element, causing the second sub-detection light to be emitted towards the measured object;

Step 1043: by the third optical element, receiving the second sub-detection light reflected by the measured object, and emitting the second sub-detection light towards the third opening;

Step 1044: the second sub-detection light reflected by the third optical element passing through the third opening and being reflected at least once between an inner wall of the outer supporter and an outer wall of the inner supporter; and Step 1045: the second sub-detection light reflected at least once passing through the first opening and being emitted towards the first optical element.

Step 105 includes:

Step 1051: by the first optical element, causing the second sub-detection light emitted in through the first opening to be emitted to the timing circuit; and Step 1052: by the timing circuit, finishing timing and generating the second time.

A distance L between the second optical element on the detection light ranging apparatus and the measured object is calculated by the following equation:

$$L = \frac{ct - (n \times \sqrt{D^2 + d^2 - 2Dd \times \cos\theta} + l + 2N)}{2};$$

where n is the number of light path sections between the inner supporter and the outer supporter, N is a distance between a rotation axis of the second optical element and the second opening, D is a radius of the outer supporter, d is a radius of the inner supporter, θ is an angle between the connecting line of the first opening and the axis and the connecting line of the second opening and the axis, l is a length of a light path of the first and second sub-detection light within the inner supporter, c is the speed of light, and t is a difference between the first time and the second time.

DETAILED DESCRIPTION

To improve understanding of the technical solution of this disclosure for those skilled in the art, the detection light ranging apparatus and method provided in the disclosure will be described below in detail in conjunction with the accompanying drawings and exemplary embodiments.

First Exemplary Embodiment

According to one aspect of the disclosure, this exemplary embodiment provides a detection light ranging apparatus. As shown in FIGS. 1-5, the detection light ranging apparatus comprises: a detection light emitting circuit 1 that emits detection light; a first optical assembly 2 that divides the detection light into a first sub-detection light and a second sub-detection light; a second optical assembly 3 that receives the second sub-detection light and causes the second sub-detection light to be emitted after being reflected at least once after being reflected by the measured object; and a timing circuit 4 that receives the first sub-detection light and starts timing to obtain a first time, and receives the second sub-detection light emitted after being reflected at least once and finishes timing to obtain a second time.

That is, the detection light emitting circuit 1 emits all the detection light towards the first optical assembly 2, wherein a part of the detection light (i.e., the first sub-detection light) is emitted towards the timing circuit 4 via the first optical assembly 2, at which time, the timing is started to obtain the first time; and another part of the detection light (i.e., the second sub-detection light) is emitted towards the second optical assembly 3 via the first optical assembly 2 before emitting towards the measured object. The second sub-detection light is emitted towards the second optical assembly 3, reflected at least once therein after being reflected by the measured object, and finally emitted to the timing circuit 4, at which time, the timing is finished to obtain the second time. The distance between the detection light ranging apparatus and the measured object may be obtained by means of the first time and the second time.

In the exemplary embodiment according to the disclosure, the second sub-detection light is totally reflected in the second optical assembly 3.

Figure 2:
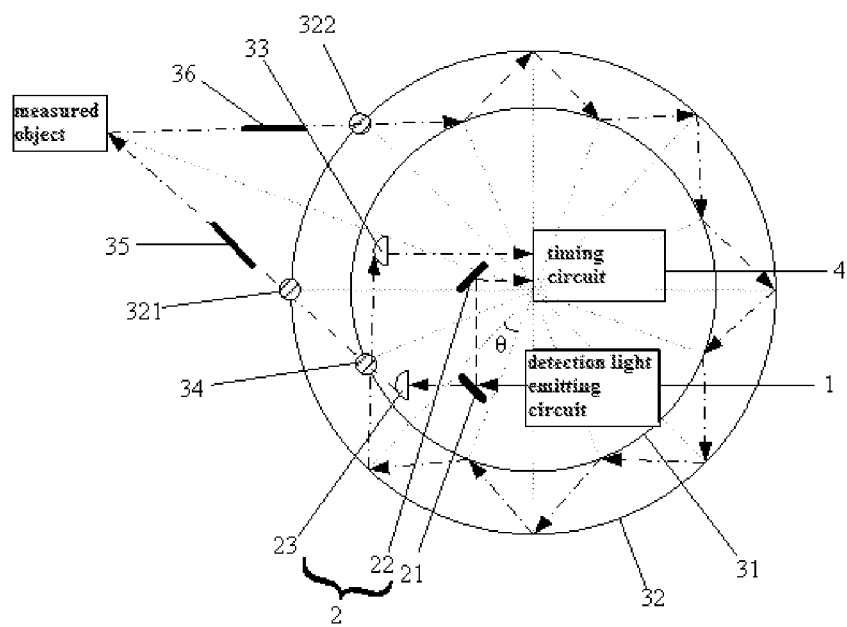
FIG. 2 is a schematic diagram illustrating a first ranging situation of the detection light ranging apparatus according to the first exemplary embodiment of the disclosure.

As shown in FIG. 2, the second optical assembly 3 includes an inner supporter 31, an outer supporter 32 and a first optical element 33, wherein the inner supporter 31 is located inside of the outer supporter 32, the first optical assembly 2, the detection light emitting circuit 1, the timing circuit 4 and the first optical element 33 are located within the inner supporter 31, the inner supporter 31 is provided with a first opening 34 and the outer supporter 32 is provided with a second opening 321 and a third opening 322.

The second opening 321 is used for causing the second sub-detection light passing through the first opening 34 to be emitted towards the measured object.

As shown in FIG. 2, the first opening 34, the second opening 321 and the measured object are on the same line, that is, the first optical assembly 2 causes the second sub-detection light to pass through the first opening 34 and the second opening 321 successively to be emitted towards the measured object.

The third opening 322 is used for causing the second sub-detection light reflected by the measured object to pass through so that the second sub-detection light is reflected at least once between an inner wall of the outer supporter 32 and an outer wall of the inner supporter 31.

As shown in FIG. 2, after emitting towards the measured object, the second sub-detection light is reflected by the measured object to the outer supporter 32. At this time, the reflected second sub-detection light passes through the third opening 322 on the outer supporter 32 to be emitted towards the inner supporter 31. Then, the second sub-detection light is reflected or totally reflected for multiple times between the inner wall of the outer supporter 32 and the outer wall of the inner supporter 31. By increasing the times of reflection of the second sub-detection light, the light path of the second sub-detection light can be extended, thereby improving the measuring precision.

The first opening 34 is further used for causing the second sub-detection light after multiple reflections to pass through and emit towards the first optical element 33.

As shown in FIG. 2, after being totally reflected for multiple times between the inner wall of the outer supporter 32 and the outer wall of the inner supporter 31, the second sub-detection light is emitted from the first opening 34 towards the first optical element 33. That is, after being emitted from the first optical assembly 2, the second sub-detection light passes through the first opening 34 twice subsequently, wherein one is being emitted from the first opening 34, and the other is being emitted in via the first opening 34.

The first optical element 33 is used for causing the second sub-detection light emitted in via the first opening 34 to be emitted to the timing circuit 4.

As shown in FIG. 2, after the second sub-detection light passes through the first opening 34 to be emitted towards the first optical element 33, a direction of the second sub-detection light is changed by the first optical element 33 so that the second sub-detection light is emitted towards the timing circuit 4 and the timing circuit 4 finishes timing to obtain the second time.

It should be noted that positions of the detection light emitting circuit 1 and the timing circuit 4 are not limited within the inner supporter 31. The detection light emitting circuit 1 and the timing circuit 4 may not be located within the inner supporter 31, but may be provided according to actual situations as long as the detection light emitting circuit 1 can emit detection light to the first optical assembly 2 and the timing circuit 4 can receive the first sub-detection light and the second sub-detection light that is emitted from the first optical element 33.

In the exemplary embodiment according to the disclosure, the inner supporter 31 and the outer supporter 32 have the same shape.

By doing so, the object is to cause the second sub-detection light to be emitted in from the first opening 34 after being reflected at least once between the inner wall of the outer supporter 32 and the outer wall of the inner supporter 31.

In the exemplary embodiment according to the disclosure, the inner supporter 31 and the outer supporter 32 may be S-shaped or arcuate or irregularly curved.

Shapes of the inner supporter 31 and the outer supporter 32 are not limited thereto; other shapes may also be adopted, and the inner supporter 31 and the outer supporter 32 may also be formed of multiple spaced independent reflective structures (the reflective structures are used as reflective points).

In the exemplary embodiment according to the disclosure, the second optical assembly 3 further includes a second optical element 35 and a third optical element 36 that are located outside of the outer supporter 32.

The second optical element 35 is used for causing the second sub-detection light emitting from the second opening 321 to be emitted towards the measured object.

A reason for providing the second optical element 35 and the third optical element 36 is that the first opening 34, the second opening 321 and the measured object are not necessarily on the same line. By means of the second optical element 35, even if the measured object is not on the same line with the first opening 34 and the second opening 321, the second sub-detection light from the second opening 321 may still emit towards the measured object by adjusting an angle of the second optical element 35.

The third optical element 36 is used for receiving the second sub-detection light reflected by the measured object, and emitting the second sub-detection light towards the third opening 322.

Similarly, the second sub-detection light is not necessarily emitted in the third opening 322 after being reflected by the measured object, but the second sub-detection light reflected by the measured object may be emitted in the third opening 322 by providing the third optical element 36 and adjusting an angle thereof.

In the exemplary embodiment according to the disclosure, both of the inner supporter 31 and the outer supporter 32 are circular rings, and have the same axis.

That is, the inner supporter 31 and the outer supporter 32 are both in a ring shape and are disposed coaxially. By doing so, the object is to reach the same light path in each reflection while the second sub-detection light is totally reflected between the inner wall of the outer supporter 32 and the outer wall of the inner supporter 31, so as to facilitate calculation.

In the exemplary embodiment according to the disclosure, the second optical element 35 and the third optical element 36 are disposed symmetrically with respect to a connecting line of the measured object and the axis.

In the exemplary embodiment according to the disclosure, the second opening 321 and the third opening 322 are also disposed symmetrically with respect to the connecting line of the measured object and the axis.

As shown in FIG. 2, the connecting line of the measured object and the axis may be obtained by connecting the measured object and the axis (hereafter referred to as "the first connecting line"). By disposing the second optical element 35 and the third optical element 36 symmetrically with respect to the first connecting line, it is benefit for the second sub-detection light to be emitted from the second opening 321 towards the measured object before being reflected to the third opening 322.

In the exemplary embodiment according to the disclosure, the second optical element 35 and the third optical element 36 are rotatable, and a rotation angle of the second optical element 35 is the same with that of the third optical element 36 that rotates in a direction opposite to a rotation direction of the second optical element 35.

Further, as shown in FIG. 2, an extended line of a connecting line of the first opening 34 and the second opening 321 is referred as the second connecting line, and an extended line of a connecting line of the third opening 322 and the reflective point of the first total reflection is referred as the third connecting line. In the exemplary embodiment according to the disclosure, the second optical element 35 is located on the second connecting line, and the third optical element 36 is located on the third connecting line. That is, a rotation axis of the second optical element 35 during rotation is located on the second connecting line, and a rotation axis of the third optical element 36 during rotation is located on the third connecting line. In addition, a rotation angle of the second optical element 35 is the same with that of the third optical element 36 that rotates in a direction opposite to a rotation direction of the second optical element 35, i.e., if the second optical element 35 is rotated 30 degrees clockwise, the third optical element 36 is rotated 30 degrees counterclockwise. However, the rotation angles of the second optical element 35 and the third optical element 36 are not limited thereto, but may also be adjusted according to the actual position of the measured object.

It should be noted that the rotation angles of the second optical element 35 and the third optical element 36 must be adjusted at the same time. Since the optical elements 35, 36 and openings 321, 322 are all disposed symmetrically, as long as the second sub-detection light is ensured to be emitted from the first opening 34 to the second opening 321, and then be reflected by the second optical element 35 that is rotated a certain angle, the second sub-detection light reflected by the measured object is certain to pass through the third opening 322 after being emitted towards the third optical element 36. Therefore, the second optical element 35 is an active rotating element.

As shown in FIG. 2, the first optical assembly 2 includes a fourth optical element 21, a fifth optical element 22, and a sixth optical element 23, wherein the fourth optical element 21 and fifth optical element 22 are disposed oppositely.

By disposing the fourth optical element 21 and the fifth optical element 22 oppositely, the object is to cause the first sub-detection light generated by the fourth optical element 21 to be directly reflected onto the fifth optical element 22. Certainly, the positional relationship of the fourth optical element 21 and fifth optical element 22 is not limited thereto as long as the fourth optical element 21 is located to emit the detection light emitted by the detection light emitting circuit 1 towards the fifth optical element 22.

The fourth optical element 21 is used for dividing the detection light into the first sub-detection light and the second sub-detection light, and causing the first sub-detection light to be reflected to the fifth optical element 22 and the second sub-detection light to be emitted towards the sixth optical element 23.

That is, the fourth optical element 21 may be used for both reflection and transmittance of light. Specifically, the first sub-detection light (shown in dash lines in FIG. 2) is emitted towards the fifth optical element 22 via a reflection function of the fourth optical element 21, and the second sub-detection light (shown in dot dash lines in FIG. 2) is emitted towards the sixth optical element 23 via an transmittance function of the fourth optical element 21.

The fifth optical element 22 is used for reflecting the first sub-detection light to the timing circuit 4. That is, the fifth optical element 22 is used for reflecting the first sub-detection light to the timing circuit 4 so that the timing circuit 4 starts timing after receiving the first sub-detection light, thereby obtaining the first time.

The sixth optical element 23 is used for causing the second sub-detection light to pass through the first opening 34 and the second opening 321 to be emitted towards the second optical element 35.

That is, after the second sub-detection light is emitted to the sixth optical element 23, a direction of the second sub-detection light is changed by the sixth optical element 23 so that the second sub-detection light passes through the first opening 34 and the second opening 321, and finally is emitted to the measured object. It should be understood that the first opening 34 and the second opening 321 are only used for the second sub-detection light to pass through, having no function of changing the direction of the second sub-detection light.

In the exemplary embodiment according to the disclosure, the first optical element 33 and the sixth optical element 23 are both lenses; the fourth optical element 21 is a half mirror; and the second optical element 35, the third optical element 36 and the fifth optical element 22 are made of a reflective material, or the second optical element 35, the third optical element 36 and the fifth optical element 22 are provided with a reflective material layer. In the exemplary embodiment according to the disclosure, the second optical element 35, the third optical element 36 and the fifth optical element 22 may be plane mirrors.

That is, the first optical element 33 and the sixth optical element 23 may change a direction of light; the fourth optical element 21 may allow a part of light to pass through and another part to be reflected; and the second optical element 35, the third optical element 36 and the fifth optical element 22 may reflect light.

In the exemplary embodiment according to the disclosure, an angle between a connecting line of the first opening 34 and the axis and a connecting line of the second opening 321 and the axis is half of an angle between the connecting line of the second opening 321 and the axis and a connecting line of the third opening 322 and the axis.

Figure 5:
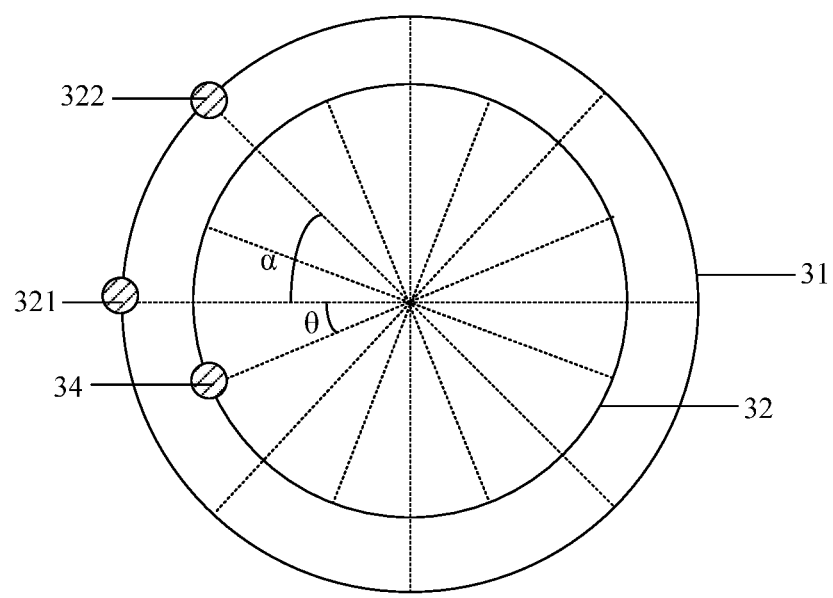
FIG. 5 is a schematic diagram illustrating an angular relationship of respective openings of the detection light ranging apparatus according to the first exemplary embodiment of the disclosure.

As shown in FIG. 5, the angle between the connecting line of the first opening 34 and the axis and the connecting line of the second opening 321 and the axis is θ, and the angle between the connecting line of the second opening 321 and the axis and the connecting line of the third opening 322 and the axis is α, i.e., θ is half of α. By such angular setting, the reflective path of the second sub-detection light reflected between the inner wall of the outer supporter 32 and the outer wall of the inner supporter 31 has a certain law (as shown in FIG. 2).

As shown in FIG. 2, the first opening 34 is located at a side of the second opening 321 away from the third opening 322.

In the exemplary embodiment according to the disclosure, for the angle with respect to the axis, an angle between the second opening 321 and the third opening 322 is about 45 degrees, and an angle between the first opening 34 and the second opening 321 is about 22.5 degrees.

That is, θ is about 22.5 degrees, and a is about 45 degrees. Certainly, degrees of θ and α are not limited thereto, and may be other degrees.

In the exemplary embodiment according to the disclosure, the inner wall of the outer supporter 32 and the outer wall of the inner supporter 31 may be both made of a total reflective material. The reason for such setting is to make the second sub-detection light totally reflected between the inner wall of the outer supporter 32 and the outer wall of the inner supporter 31.

In the exemplary embodiment according to the disclosure, the inner wall of the outer supporter 32 and the outer wall of the inner supporter 31 are both provided with a total reflective material layer.

The inner wall of the outer supporter 32 and the outer wall of the inner supporter 31 may also made of materials that are not totally reflective, as long as that a total reflective material is provided at a fixed total reflective point to make the second sub-detection light totally reflected between the inner wall of the outer supporter 32 and the outer wall of the inner supporter 31.

Ranging situations of the measured object at three different positions will be described below in detail with reference to FIGS. 2-4.

First ranging situation: the measured object is located at an intersection point of the first, second and third connecting lines.

As shown in FIG. 2, the measured object is located at the intersection point of the first, second and third connecting lines, i.e., the second sub-detection light may be directly emitted towards the measured object after passing through the first opening 34 and the second opening 321. In such case, an angle of the second optical element 35 relative to the second connecting line is zero, i.e., the second optical element 35 is not rotated, so that the second sub-detection light is directly emitted to the measured object; similarly, after being reflected by the measured object, the second sub-detection light may be directly emitted towards the third opening 322, in which case, the third optical element 36 does not need to be rotated.

Second ranging situation: the measured object is located outside of an intersection point of the first, second and third connecting lines, i.e., the measured object is located at a side away from the outer supporter 32 with respect to the intersection point.

Figure 3:
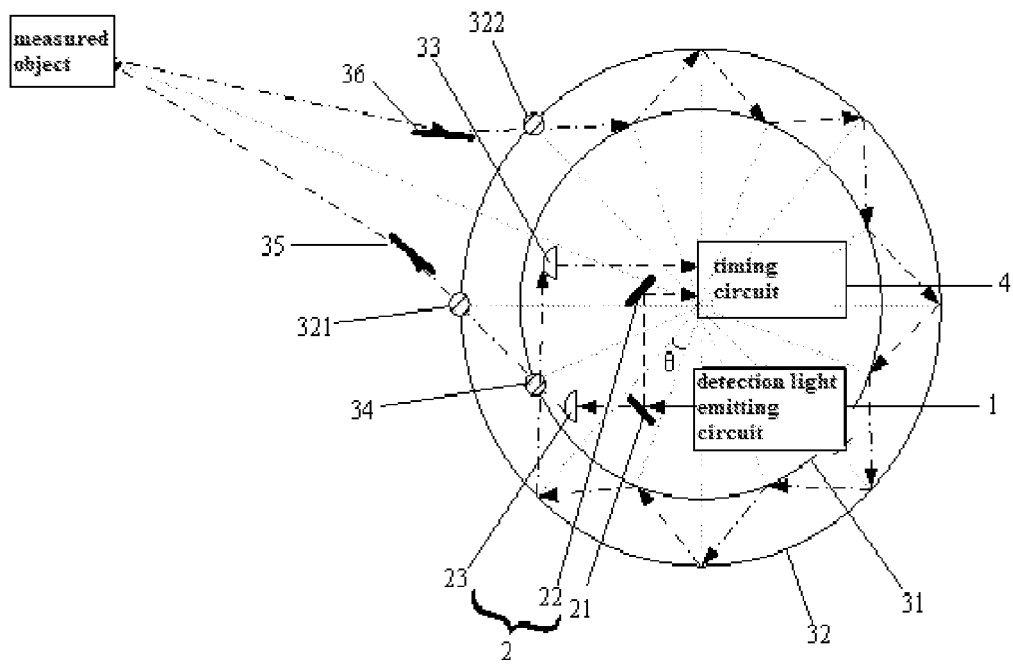
FIG. 3 is a schematic diagram illustrating a second ranging situation of the detection light ranging apparatus according to the first exemplary embodiment of the disclosure.

As shown in FIG. 3, since the measured object is located outside of the intersection point of the first, second and third connecting lines, the second optical element 35 needs to be rotated a certain angle counterclockwise so that the second sub-detection light may be emitted towards the measured object after being emitted from the second opening 321; similarly, the third optical element 36 needs to be rotated the same angle clockwise so that the second sub-detection light reflected by the measured object may be emitted towards the third opening 322.

Third ranging situation: the measured object is located inside of an intersection point of the first, second and third connecting lines, i.e., the measured object is located at a side near the outer supporter 32 with respect to the intersection point.

Figure 4:
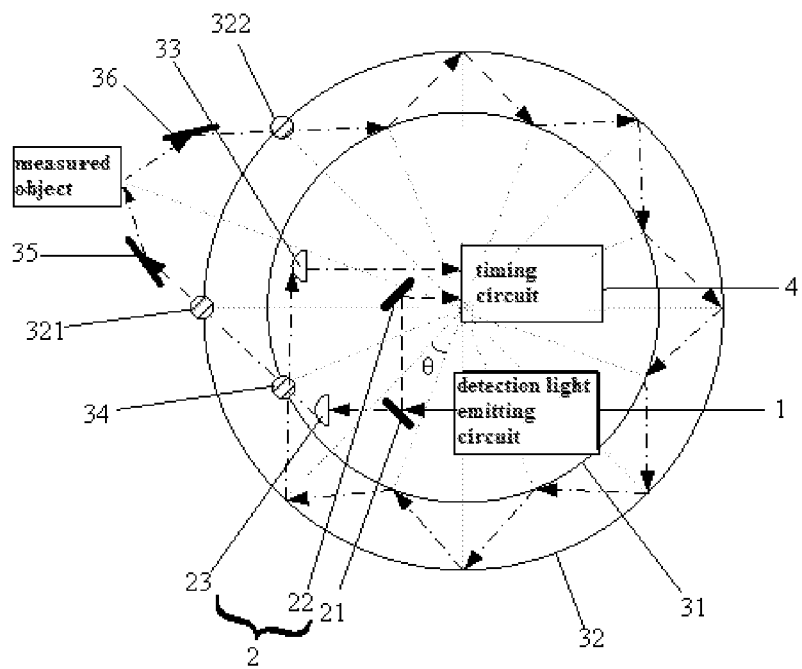
FIG. 4 is a schematic diagram illustrating a third ranging situation of the detection light ranging apparatus according to the first exemplary embodiment of the disclosure.

As shown in FIG. 4, since the measured object is located inside of the intersection point of the first, second and third connecting lines, the second optical element 35 needs to be rotated a certain angle clockwise so that the second sub-detection light may be emitted towards the measured object after being emitted from the second opening 321; similarly, the third optical element 36 needs to be rotated the same angle counterclockwise so that the second sub-detection light reflected by the measured object may be emitted towards the third opening 322.

It should be noted that the above three situations merely depict the light path during the process that the second sub-detection light is emitted from the second opening 321 into the third opening 322. For the light paths before the second sub-detection light is emitted from the second opening 321 and after being emitted in the third opening 322, please refer to the foregoing description in the exemplary embodiment, which will not be repeated here.

With the detection light ranging apparatus of this exemplary embodiment, a distance L between the second optical element 35 on the detection light ranging apparatus and the measured object may be calculated by the following equations (1) to (3), specifically, $$M^2 = D^2 + d^2 - 2Dd \times \cos\theta \quad (1)$$

$$2L + nM + 2N + l = ct \quad (2)$$

$$L = \frac{ct - (n \times \sqrt{D^2 + d^2 - 2Dd \times \cos\theta} + l + 2N)}{2} \quad (3)$$

where n is the number of light path sections between the inner supporter 31 and the outer supporter 32, M is a length of each of the light path sections between the inner supporter 31 and the outer supporter 32, N is a distance between a rotation axis of the second optical element 35 and the second opening 321, D is a radius of the outer supporter 32, d is a radius of the inner supporter 31, θ is an angle between the connecting line of the first opening 34 and the axis and the connecting line of the second opening 321 and the axis, l is a length of a light path of the first and second sub-detection light within the inner supporter 31, c is the speed of light, and t is a difference between the first time and the second time.

With respect to these three equations, equation (1) may be put into equation (2) to obtain equation (3), thereby calculating the distance L between the second optical element 35 on the detection light ranging apparatus and the measured object, and indirectly obtaining a distance between the detection light ranging apparatus and the measured object by conversion.

It should be noted that M is a length of each of the light path sections between the inner supporter 31 and the outer supporter 32, i.e., one light path will be added each time that the second sub-detection light is totally reflected between the inner supporter 31 and the outer supporter 32. In this embodiment, there are 14 light paths between the inner supporter 31 and the outer supporter 32. Therefore, n in equation (2) is 14 here. The number of light paths is not limited thereto, but may be set according to actual situations. In addition, the number of light paths varies with the degree of the semi-arc, for example, if the semi-arc is 30 degrees, then the number of light paths n is 10.

In this exemplary embodiment, the detection light is laser. Type of the detection light is not limited to laser, but may be other types of light.

By causing the second sub-detection light to be reflected at least once between the outer wall of the inner supporter 31 and the inner wall of the outer supporter 32 after being reflected by the measured object, the detection light ranging apparatus of this exemplary embodiment can extend the light path of the detection light, and, especially for short distance ranging, greatly improve measuring precision; and, with the same measuring precision, it may not only reduce high-frequency circuit designs and clock frequency requirements, but also reduce signal interferences.

Second Exemplary Embodiment

Figure 1:
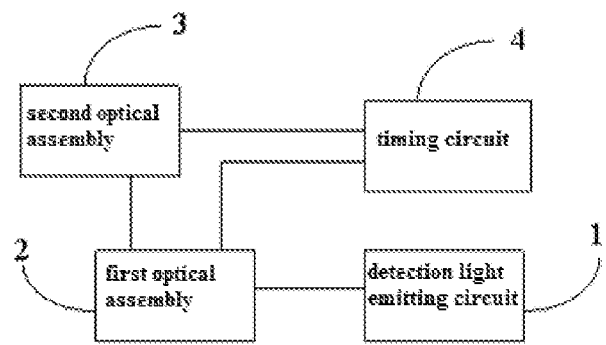
FIG. 1 is a schematic diagram illustrating a configuration of a detection light ranging apparatus according to the first exemplary embodiment of the disclosure.

According to another aspect of the disclosure, this exemplary embodiment provides a detection light ranging method. the detection light ranging method measures a distance by using the detection light ranging apparatus of the first exemplary embodiment. As shown in FIG. 1, the detection light ranging apparatus comprises a detection light emitting circuit 1, a first optical assembly 2, a second optical assembly 3 and a timing circuit 4.

In the exemplary embodiment according to the disclosure, as shown in FIG. 2, the first optical assembly 2 includes a fourth optical element 21, a fifth optical element 22, and a sixth optical element 23, wherein the fourth optical element 21 and the fifth optical element 22 are disposed oppositely.

In the exemplary embodiment according to the disclosure, the second optical assembly 3 includes an inner supporter 31, an outer supporter 32 and a first optical element 33, wherein the inner supporter 31 is located inside of the outer supporter 32, the first optical assembly 2, the detection light emitting circuit 1, the timing circuit 4 and the first optical element 33 are located within the inner supporter 31, the inner supporter 31 is provided with a first opening 34 and the outer supporter 32 is provided with a second opening 321 and a third opening 322.

In the exemplary embodiment according to the disclosure, the second optical assembly 3 further includes a second optical element 35 and a third optical element 36 that are located outside of the outer supporter 32.

In the exemplary embodiment according to the disclosure, both of the inner supporter 31 and the outer supporter 32 are circular rings, and have the same axis; the second opening 321 and the third opening 322 are disposed symmetrically with respect to a connecting line of the measured object and the axis; the second optical element 35 and the third optical element 36 are also disposed symmetrically with respect to the connecting line of the measured object and the axis; the second optical element 35 and the third optical element 36 are rotatable, and a rotation angle of the second optical element 35 is the same with that of the third optical element 36 that rotates in a direction opposite to a rotation direction of the second optical element 35.

Figure 6:
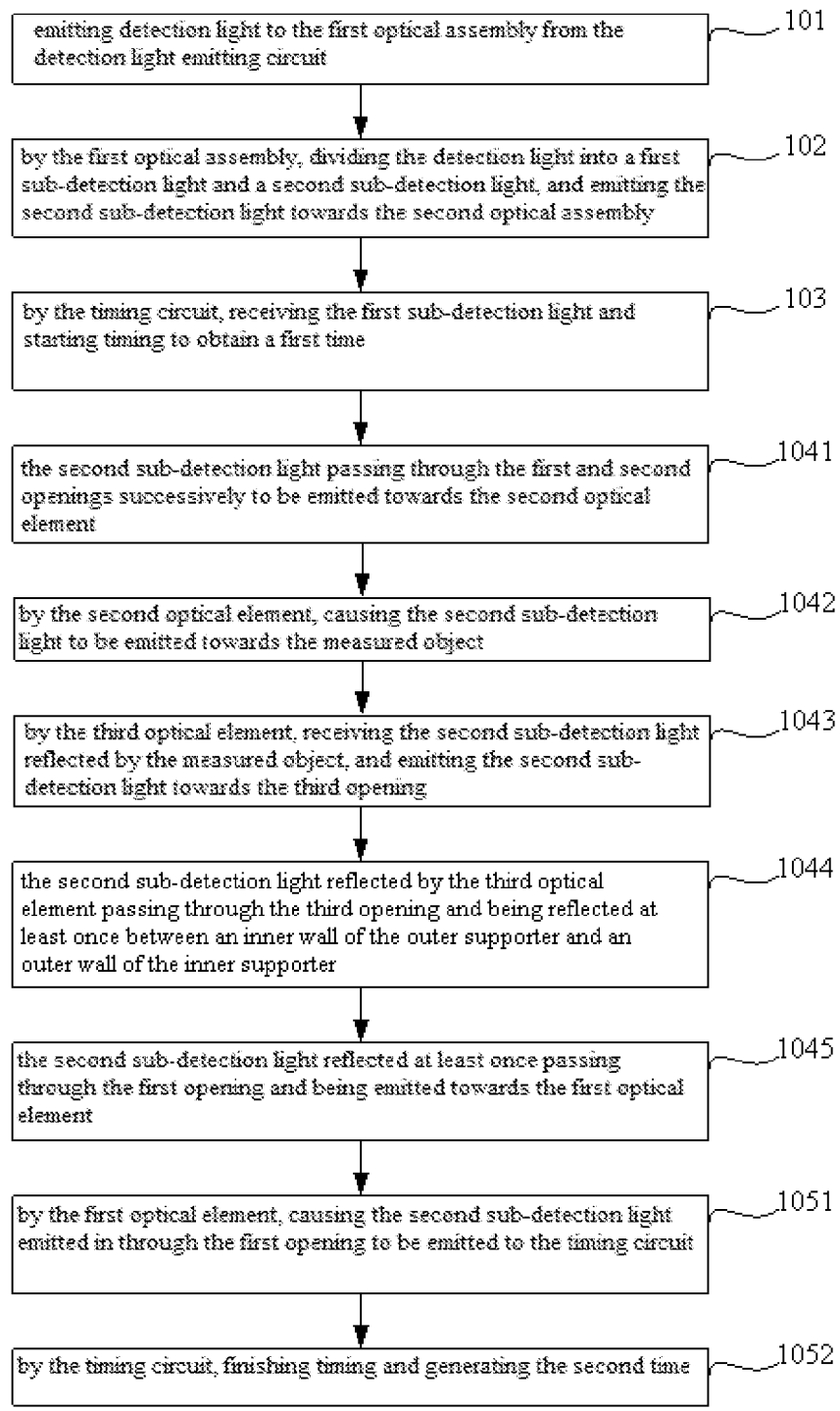
FIG. 6 is a flowchart illustrating a detection light ranging method according to the second exemplary embodiment of the disclosure.

As shown in FIG. 6, the detection light ranging method of the exemplary embodiment comprises the following steps:

Step 101: emitting detection light to the first optical assembly 2 from the detection light emitting circuit 1;

Step 102: by the first optical assembly 2, dividing the detection light into a first sub-detection light and a second sub-detection light, and emitting the second sub-detection light towards the second optical assembly 3.

Specifically, in Step 102, the fourth optical element 21 divides the detection light into the first sub-detection light and the second sub-detection light, and causes the first sub-detection light to be reflected to the fifth optical element 22.

Step 103: by the timing circuit 4, receiving the first sub-detection light and starting timing to obtain a first time.

Specifically, in Step 103, the fifth optical element 22 reflects the first sub-detection light to the timing circuit 4 so that the timing circuit 4 starts timing to obtain the first time.

Step 104: by the second optical assembly 3, receiving the second sub-detection light and causing the second sub-detection light to be emitted after being reflected at least once after being reflected by the measured object.

Specifically, Step 104 includes:

Step 1041: the second sub-detection light passing through the first opening 34 and the second opening 321 successively to be emitted towards the second optical element 35;

Step 1042: by the second optical element 35, causing the second sub-detection light to be emitted towards the measured object;

Step 1043: by third optical element 36, receiving the second sub-detection light reflected by the measured object, and emitting the second sub-detection light towards the third opening 322;

Step 1044: the second sub-detection light reflected by the third optical element passing through the third opening 322 and being reflected at least once between an inner wall of the outer supporter 32 and an outer wall of the inner supporter 31; and Step 1045: the second sub-detection light reflected at least once passing through the first opening 34 and being emitted towards the first optical element 33; and Step 105: by the timing circuit 4, receiving the second sub-detection light and finishing timing to obtain a second time.

Specifically, Step 105 includes:

Step 1051: by the first optical element 33, causing the second sub-detection light emitted in through the first opening 34 to be emitted to the timing circuit 4; and Step 1052: by the timing circuit 4, finishing timing and obtaining the second time.

With the detection light ranging method of this exemplary embodiment, a distance L between the second optical element 35 on the detection light ranging apparatus and the measured object may be calculated by the following equations (1) to (3), specifically, $$M^2 = D^2 + d^2 - 2Dd \times \cos\theta \quad (1)$$

$$2L + nM + 2N + l = ct \quad (2)$$

$$L = \frac{ct - \left(n \times \sqrt{D^2 + d^2 - 2Dd \times \cos\theta} + l + 2N\right)}{2} \quad (3)$$

wherein n is the number of light path sections between the inner supporter 31 and the outer supporter 32, M is a length of each of the light path sections between the inner supporter 31 and the outer supporter 32, N is a distance between a rotation axis of the second optical element 35 and the second opening 321, D is a radius of the outer supporter 32, d is a radius of the inner supporter 31, θ is an angle between the connecting line of the first opening 34 and the axis and the connecting line of the second opening 321 and the axis, l is a length of a light path of the first and second sub-detection light within the inner supporter 31, c is the speed of light, and t is a difference between the first time and the second time.

With respect to these three equations, equation (1) may be put into equation (2) to obtain equation (3), thereby calculating the distance L between the second optical element 35 on the detection light ranging apparatus and the measured object, and indirectly obtaining a distance between the detection light ranging apparatus and the measured object by conversion.

It should be noted that M is a length of each of the light path sections between the inner supporter 31 and the outer supporter 32, i.e., one light path will be added each time that the second sub-detection light is totally reflected between the inner supporter 31 and the outer supporter 32. In this embodiment, there are 14 light paths between the inner supporter 31 and the outer supporter 32. Therefore, n in equation (2) is 14 here. The number of light paths is not limited thereto, but may be set according to actual situations. In addition, the number of light paths varies with the degree of the semi-arc, for example, if the semi-arc is 30 degrees, then the number of light paths n is 10.

By causing the second sub-detection light to be reflected at least once between the outer wall of the inner supporter 31 and the inner wall of the outer supporter 32 after being reflected by the measured object, the detection light ranging method of this exemplary embodiment can extend the light path of the detection light, and, especially for short distance ranging, greatly improve measuring precision; and, with the same measuring precision, it may not only reduce high-frequency circuit designs and clock frequency requirements, but also reduce signal interferences.

It should be understood that the above embodiments are merely exemplary embodiments for the purpose of illustrating the principle of the disclosure, and the disclosure is not limited thereto. Various modifications and improvements can be made by a person having ordinary skill in the art without departing from the spirit and essence of the disclosure. Accordingly, all of the modifications and improvements also fall into the protection scope of the disclosure.

What is claimed is:

1. A detection light ranging apparatus comprising:
a detection light emitting circuit that emits detection light;
a first optical assembly that divides the detection light into a first sub-detection light and a second sub-detection light;
a second optical assembly that receives the second sub-detection light and causes the second sub-detection light to be emitted after being reflected at least once after being reflected by a measured object; and
a timing circuit that receives the first sub-detection light and starts a timing to obtain a first time, and receives the second sub-detection light emitted after being reflected at least once and finishes the timing to obtain a second time,
wherein the second optical assembly comprises an inner supporter, an outer supporter and a first optical element, the inner supporter being located inside of the outer supporter, the first optical assembly, the detection light emitting circuit, the timing circuit and the first optical element being located within the inner supporter, the inner supporter being provided with a first opening and the outer supporter being provided with second and third openings,
wherein the second opening is configured to cause the second sub-detection light passing through the first opening to be emitted towards the measured object,
wherein the third opening is configured to cause the second sub-detection light reflected by the measured object to pass through so that the second sub-detection light is reflected at least once between an inner wall of the outer supporter and an outer wall of the inner supporter,
wherein the first opening is further configured to cause the second sub-detection light reflected at least once to pass through and be emitted towards the first optical element,
wherein the first optical element is configured to cause the second sub-detection light emitted in through the first opening to be emitted to the timing circuit,
wherein the second optical assembly further comprises a second optical element that is located outside of the outer supporter,
wherein the second optical element is configured to cause the second sub-detection light from the second opening to be emitted towards the measured object,
wherein both of the inner and outer supporters have the same axis, and
wherein a distance L between the second optical element on the detection light ranging apparatus and the measured object is calculated by the following equation:

$$L = \frac{ct - \left(n \times \sqrt{D^2 + d^2 - 2Dd \times \cos\theta} + l + 2N\right)}{2};$$

where n is the number of light path sections between the inner supporter and the outer supporter, N is a distance between a rotation axis of the second optical element and the second opening, D is a radius of the outer supporter, d is a radius of the inner supporter, θ is an angle between a connecting line of the first opening and the axis of the inner and outer supporters and a connecting line of the second opening and the axis of the inner and outer supporters, l is a length of a light path of the first and second sub-detection light within the inner supporter, c is the speed of light, and t is a difference between the first time and the second time.

2. The detection light ranging apparatus according to claim 1,
wherein the inner supporter and the outer supporter have the same shape, and both of which are S-shaped or arcuate or irregularly curved.

3. The detection light ranging apparatus according to claim 1,
wherein the second optical assembly further comprises a third optical element that is located outside of the outer supporter; and
wherein the third optical element is configured to receive the second sub-detection light reflected by the measured object and emit the second sub-detection light towards the third opening.

4. The detection light ranging apparatus according to claim 3,
wherein both of the inner and outer supporters are circular rings.

5. The detection light ranging apparatus according to claim 4,
wherein the second and third openings are disposed symmetrically with respect to a connecting line of the measured object and the axis, and
wherein the second and third optical elements are also disposed symmetrically with respect to the connecting line of the measured object and the axis.

6. The detection light ranging apparatus according to claim 5, wherein the second and third optical elements are rotatable, and a rotation angle of the second optical element is the same with that of the third optical element that rotates in a direction opposite to a rotation direction of the second optical element.

7. The detection light ranging apparatus according to claim 4,
wherein an angle between a connecting line of the first opening and the axis and a connecting line of the second opening and the axis is half of an angle between the connecting line of the second opening and the axis and a connecting line of the third opening and the axis.

8. The detection light ranging apparatus according to claim 7,
wherein the first opening is located at a side of the second opening away from the third opening.

9. The detection light ranging apparatus according to claim 3,
wherein the first optical assembly comprises fourth, fifth and sixth optical elements;
wherein the fourth optical element is configured to divide the detection light into the first sub-detection light and the second sub-detection light, and causes the first sub-detection light to be reflected to the fifth optical element and the second sub-detection light to be emitted towards the sixth optical element;
wherein the fifth optical element is configured to reflect the first sub-detection light to the timing circuit; and
wherein the sixth optical element is configured to cause the second sub-detection light to pass through the first and second openings so as to be emitted towards the second optical element.

10. The detection light ranging apparatus according to claim 9,
wherein the first and sixth optical elements are both lenses; the fourth optical element is a half mirror; and the second, third and fifth optical elements are made of a reflective material, or the second, third and fifth optical elements are provided with a reflective material layer.

11. A detection light ranging method for measuring a distance using the detection light ranging apparatus according to claim 9, the method comprising:
emitting detection light to the first optical assembly from the detection light emitting circuit;
by the first optical assembly, dividing the detection light into a first sub-detection light and a second sub-detection light, and emitting the second sub-detection light towards the second optical assembly;
by the timing circuit, receiving the first sub-detection light and starting a timing to obtain a first time;
by the second optical assembly, receiving the second sub-detection light and causing the second sub-detection light to be emitted after being reflected at least once after being reflected by a measured object; and
by the timing circuit, receiving the second sub-detection light emitted after being reflected at least once and finishing the timing to obtain a second time.

12. The detection light ranging method according to claim 11,
wherein the fourth optical element divides the detection light into the first sub-detection light and the second sub-detection light, and causes the first sub-detection light to be reflected to the fifth optical element.

13. The detection light ranging method according to claim 11,
wherein the fifth optical element reflects the first sub-detection light to the timing circuit so that the timing circuit starts timing to obtain the first time.

14. The detection light ranging method according to claim 11,
wherein by the second optical assembly, receiving the second sub-detection light and causing the second sub-detection light to be emitted after being reflected at least once after being reflected by a measured object, includes:
the second sub-detection light passing through the first and second openings successively to be emitted towards the second optical element;
by the second optical element, causing the second sub-detection light to be emitted towards the measured object;
by the third optical element, receiving the second sub-detection light reflected by the measured object, and emitting the second sub-detection light towards the third opening;
the second sub-detection light reflected by the third optical element passing through the third opening and being reflected at least once between an inner wall of the outer supporter and an outer wall of the inner supporter; and
the second sub-detection light reflected at least once passing through the first opening and being emitted towards the first optical element.

15. The detection light ranging method according to claim 11,
wherein by the timing circuit, receiving the second sub-detection light emitted after being reflected at least once and finishing the timing to obtain a second time, includes:
by the first optical element, causing the second sub-detection light emitted in through the first opening to be emitted to the timing circuit; and
by the timing circuit, finishing the timing and generating the second time.

16. The detection light ranging apparatus according to claim 1,
wherein the outer wall of the inner supporter and the inner wall of the outer supporter are both provided with a reflective material layer or made of a reflective material.

* * * * *